United States Patent
Estes et al.

(10) Patent No.: US 9,839,867 B2
(45) Date of Patent: Dec. 12, 2017

(54) AUTO-CLEANING MARINATION FILTER FOR POULTRY INJECTOR SYSTEM

(71) Applicant: John Bean Technologies Corporation, Chicago, IL (US)

(72) Inventors: Andrew C. Estes, Russellville, AR (US); Jeremy B. Estes, London, AR (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 14/211,725

(22) Filed: Mar. 14, 2014

(65) Prior Publication Data

US 2014/0272035 A1    Sep. 18, 2014

Related U.S. Application Data

(60) Provisional application No. 61/798,607, filed on Mar. 15, 2013.

(51) Int. Cl.

| | |
|---|---|
| *B01D 29/64* | (2006.01) |
| *B01D 29/23* | (2006.01) |
| *B01D 29/11* | (2006.01) |
| *A23L 13/50* | (2016.01) |
| *A23L 13/70* | (2016.01) |

(52) U.S. Cl.
CPC .......... *B01D 29/6484* (2013.01); *A23L 13/50* (2016.08); *A23L 13/72* (2016.08); *B01D 29/117* (2013.01); *B01D 29/23* (2013.01)

(58) Field of Classification Search
CPC ...... B01D 29/11; B01D 29/117; B01D 29/23; B01D 29/35; B01D 29/6484; B01D 2029/075; B01D 2201/3235; A23L 1/315; A23L 1/318; A23L 1/3182; A23L 3/3589
See application file for complete search history.

(56) References Cited

U.S. PATENT DOCUMENTS

| | | | | |
|---|---|---|---|---|
| 2,066,479 | A | * | 1/1937 | MacIsaac ..................... 210/777 |
| 4,622,892 | A | * | 11/1986 | Corominas ..................... 99/533 |
| 5,569,383 | A | * | 10/1996 | Vander Ark, Jr. ..... B01D 29/23 209/273 |
| 5,632,907 | A | * | 5/1997 | Norbury ..................... 210/787 |

FOREIGN PATENT DOCUMENTS

EP    1245258 A2 * 10/2002 ............. B01D 29/23

OTHER PUBLICATIONS

EP 1245258—EPO Machine Translation (2015), 7 pages.*
Merriam-Webster Definition (2015), 1 page.*
Cambridge Definition (2015), 1 page.*
Collins Definition (2015), 1 page.*
Oxford Definition (2015), 1 page.*

* cited by examiner

*Primary Examiner* — Patrick J Orme
(74) *Attorney, Agent, or Firm* — Christensen O'Connor Johnson Kindness PLLC

(57) ABSTRACT

An auto-cleaning marination filter for a poultry injector system including an outer housing having a liquid inlet and outlet, a screen that allows passage of liquids and impedes passage of solid particles, and a wiper surrounded by said screen for removing solid particles attached to the screen by reverse flow of the liquid through a gap in the wiper.

9 Claims, 4 Drawing Sheets

AUTO-CLEANING MARINATION FILTER FOR POULTRY INJECTOR SYSTEM

CROSS-REFERENCE TO RELATED APPLICATIONS

This application claims the benefit of U.S. Provisional Application No. 61/798,607, entitled "Auto-Cleaning Marination Filter for Injector" and filed on Mar. 15, 2013. The complete disclosure of said provisional patent application is hereby incorporated by reference.

STATEMENT REGARDING FEDERALLY SPONSORED RESEARCH OR DEVELOPMENT

Not applicable

BACKGROUND OF THE INVENTION

1. Field of the Invention

The present invention relates to automated poultry needle injector systems that mechanically pump a brine solution into poultry products using a pump pulling from a brine tank and a bank of needles mounted in an injection head.

2. Brief Description of the Related Art

Prior art needle injection systems pull a brine solution from a tank by means of a centrifugal pump, and the discharge goes through a series of filters and screens to separate the solid particles from the brine solution before it goes into the injection head. Once the brine gets to the injection head, it flows through a series of needles and from those needles into the product (e.g. poultry carcasses). Not all of the brine stays inside the product. The excess flows through the injector body and back into the brine tank to be filtered and reused. One drawback of the prior art system is that, throughout the process, all of the screens become clogged with solid particles that have been separated from the brine when filtered and the filters lose surface area. This causes a decrease in pressure in the discharge line downstream of the filter and prohibits the injector from injecting product consistently during the full run time shift. The injection percentage will drop after the filter becomes clogged due to running at a lower pressure. Another drawback is that as the standard filters become clogged, an operator has to manually switch from the filter in use to a secondary filter so the previous one can be removed and cleaned prior to being used again. During a normal shift, this can happen many times which requires substantial time and resources to keep the system running correctly.

The limitations of the prior art are overcome by the present invention as described below.

BRIEF SUMMARY OF THE INVENTION

The invention is directed to an auto-cleaning filter that has a wiper inside a cylindrical filtering screen to remove solids that accumulate on the internal screen surface and through the screen perforations. The wiper continuously moves along the length of the screen and removes the solids along the entire surface area. By doing this, the screen stays clean and unclogged with particles so the brine can flow freely through it and to the injection head. The solids are flushed out by brine flowing through the filtering screen in an opposite direction of normal flow, which moves the particles through a gap in the wiper. The particles are then moved out of the filter to a rotating cylindrical screen over the brine tank that includes an auger to pass the solids to a waste bin. This keeps the filter continuously free of solid debris so brine can always flow through the filter easily and without restriction. It also eliminates the extra time and resources needed to switch and clean filters throughout the shift.

DETAILED DESCRIPTION OF THE INVENTION

Figure 1:
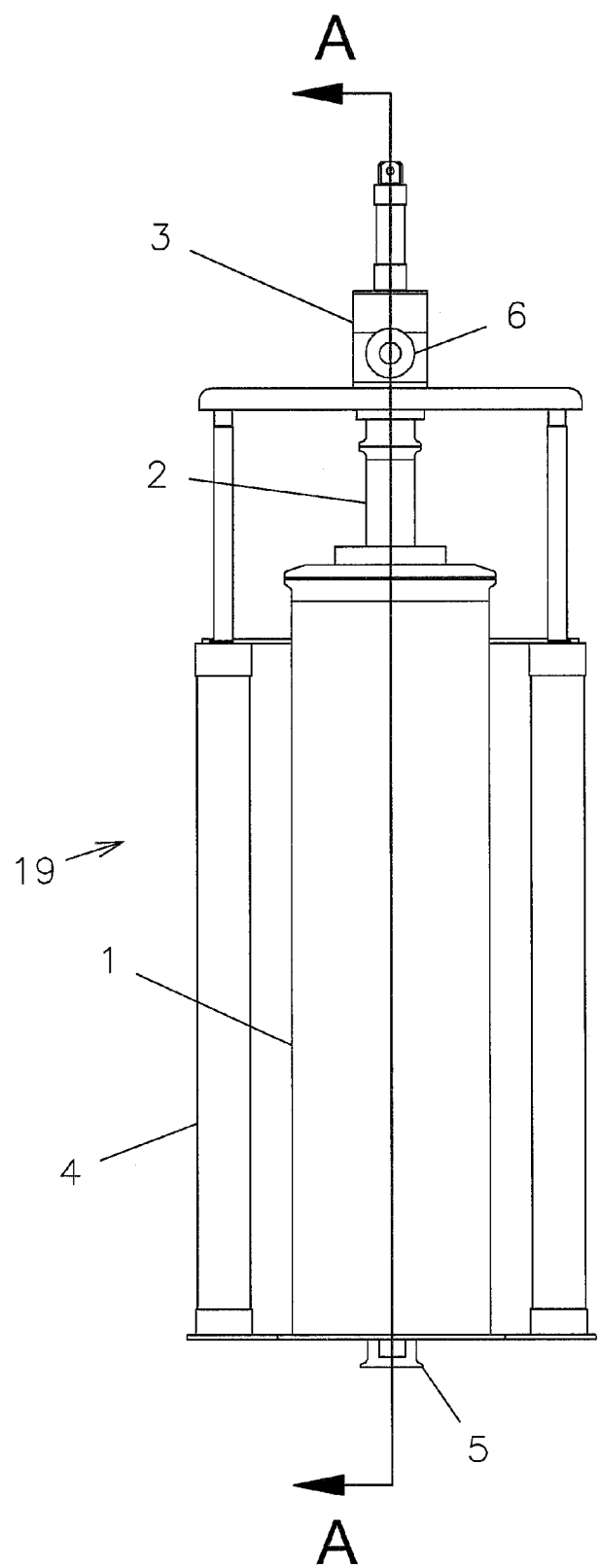
FIG. 1 is a plan view of the exterior of the auto-cleaning filter of the present invention.
Figure 2:
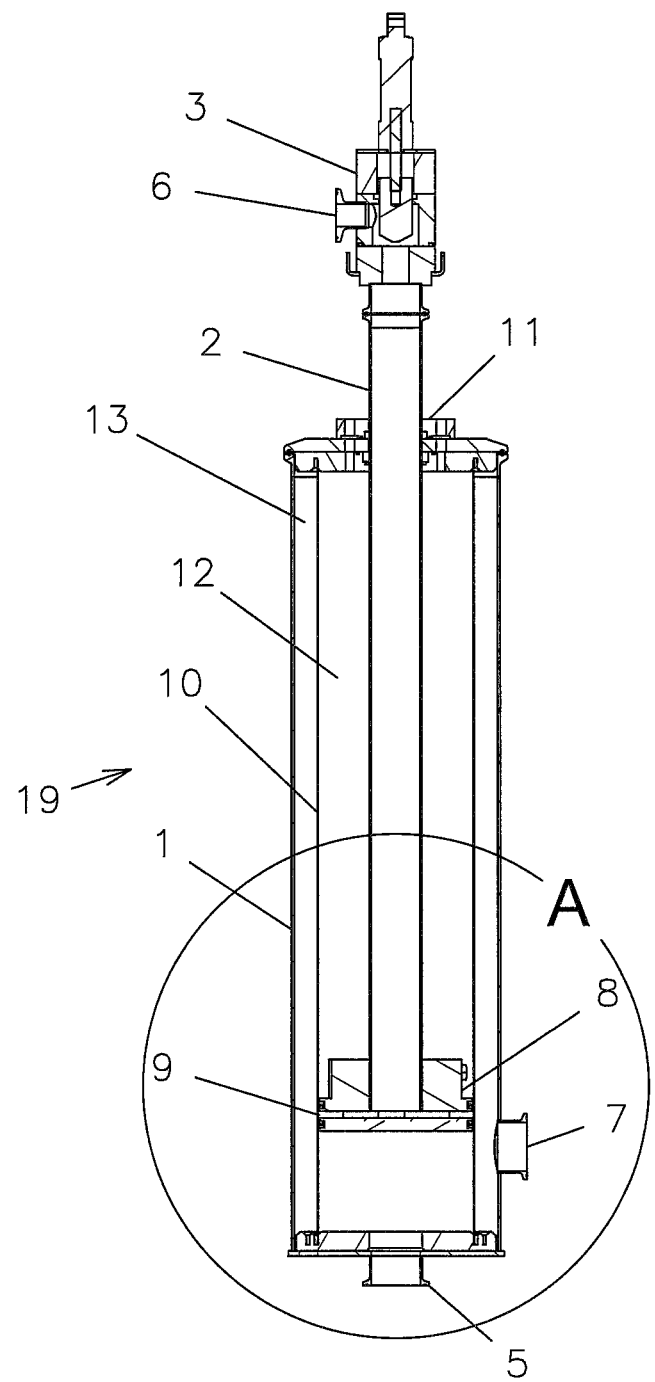
FIG. 2 shows a cut-away view of the auto-cleaning filter of the present invention taken along the line A-A of FIG. 1.
Figure 3:
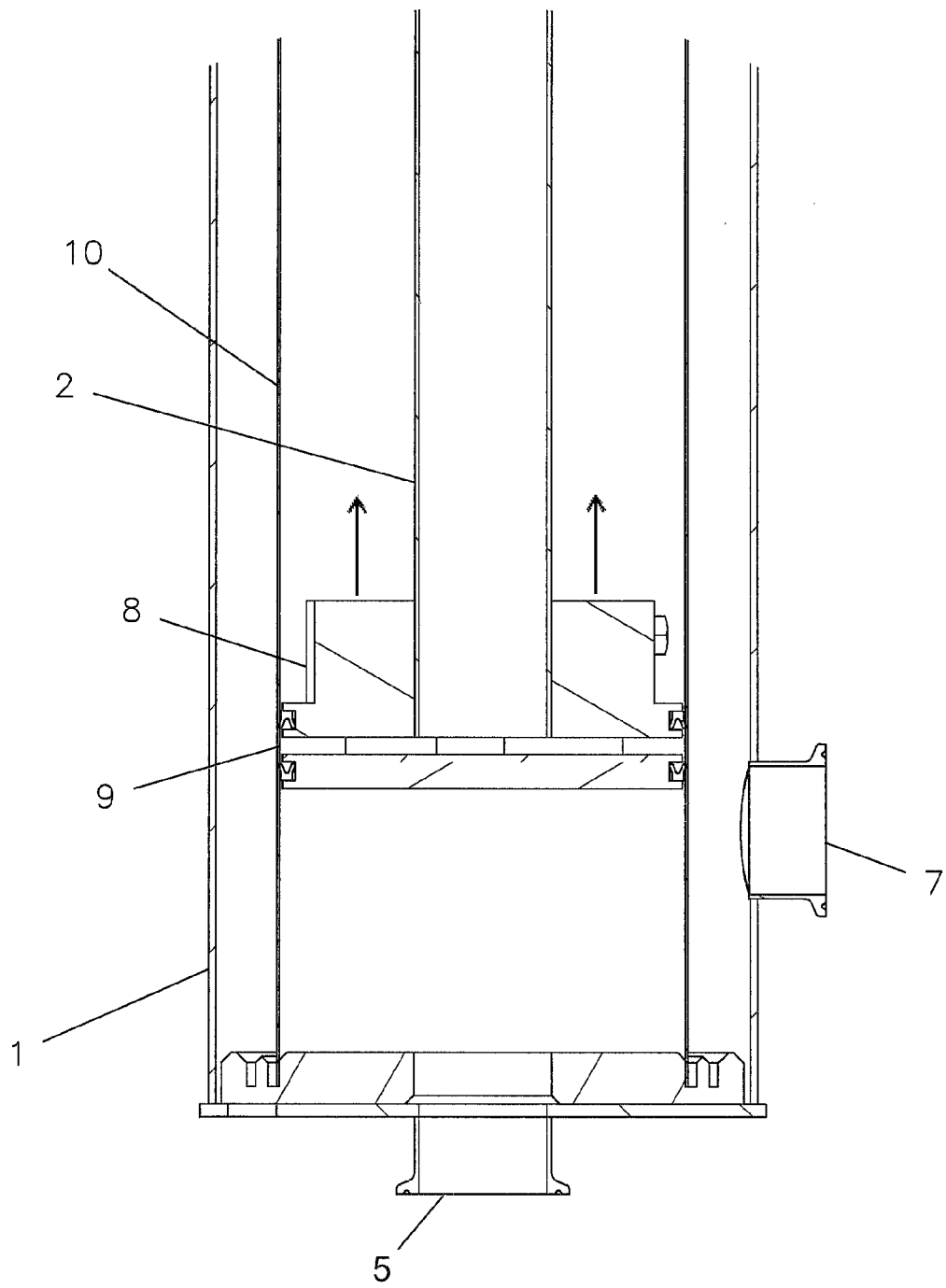
FIG. 3 is a detailed cut-away view of the wiper internal the filter screen of FIG. 2.

With reference to FIGS. 1-4, the preferred embodiments of the present invention may be described. The auto-cleaning filter 19 of the present invention includes an outer filter housing 1 and a filter screen 10. The outer filter housing 1 and filter screen 10 are preferably cylindrical. The cylindrical filter screen 10 allows the liquid brine to pass through its perforations, but collects any solids against its surface. FIG. 2 shows a sectional view illustrating the internal components of the auto-cleaning filter 19. On the inside surface of the cylindrical screen 10 is a wiper 8 that is attached to a tube 2. The wiper 8 is continuously moved or stroked with the tube 2 to the top of the screen 10 and then with the tube 2 to the bottom of the screen 10 by pneumatic cylinders 4 attached to tube 2 below valve 3. This cycle is repeated continuously so the wiper 8 is constantly moving inside the cylindrical surface of the screen 10.

The filter 19 has a brine inlet 5 on the bottom of the housing 1 and a brine outlet 7 on the side of the housing 1. Brine is pumped through the inlet 5 and into the space 12 created between the tube 2 and the screen 10. The brine mixture then moves through the screen 10 into the space 13 created between the outside surface of the screen 10 and the outer filter housing 1. As the brine flows through the screen 10, the solid particles within the brine mixture are trapped on the inner surface of the screen 10 while the liquid flows through the screen 10. The liquid brine then moves out of the filter 19 through the filter outlet 7 attached to the outer filter housing 1.

The wiper 8 has a top half and a bottom half that are separated slightly to create a gap 9 between them. This gap provides a passage to the inside of the tube 2 on which the wiper 8 is connected. The tube 2 extends out of the filter housing 1. As shown in FIG. 2, a sealed cap 11 is attached to the top of the outer filter housing 1 and receives the tube 2 as it exits the outer filter housing 1. The cap 11 prevents leakage of brine. At the top of the tube 2, there is a valve 3 that opens and closes. Opening the valve causes the brine to flow through the screen in the opposite direction (i.e. from outside the screen to inside the screen) as described above. The opposite flow of the brine is only permitted in the area surrounding the gap 9 formed in the wiper. The brine in the space 13 between the outside surface of the screen 10 and the outer filter housing 1 flows through the screen 10 and the gap 9 in the wiper. The brine then moves into the tube 2 and out of an outlet port 6 on the valve 3 on the filter 19. As this occurs, the reverse flowing brine will clean the solid particles off the inside of the screen 10 and flush them out through the valve outlet port 6. The valve outlet port 6 is connected to a hose that will transport the brine and the solid mixture back to an open screen 15 where the solids will be carried out by an auger and the brine will be re-used.

In operation, the brine inside the filter 19 will always be at a certain system pressure, which will be determined by the requirements of the operation. When the valve 3 on the filter 19 opens, the pressure through the tube 2 and in the gap 9 between the wiper 8 will drop substantially compared to the system pressure. This causes the brine to back flow in this gap 9 area only, thus cleaning a small spot on the filter each time the valve 3 opens. As this is repeated when the wiper is in different locations, the filter screen 10 will stay much cleaner than a standard system without any internal cleaning system.

Figure 4:
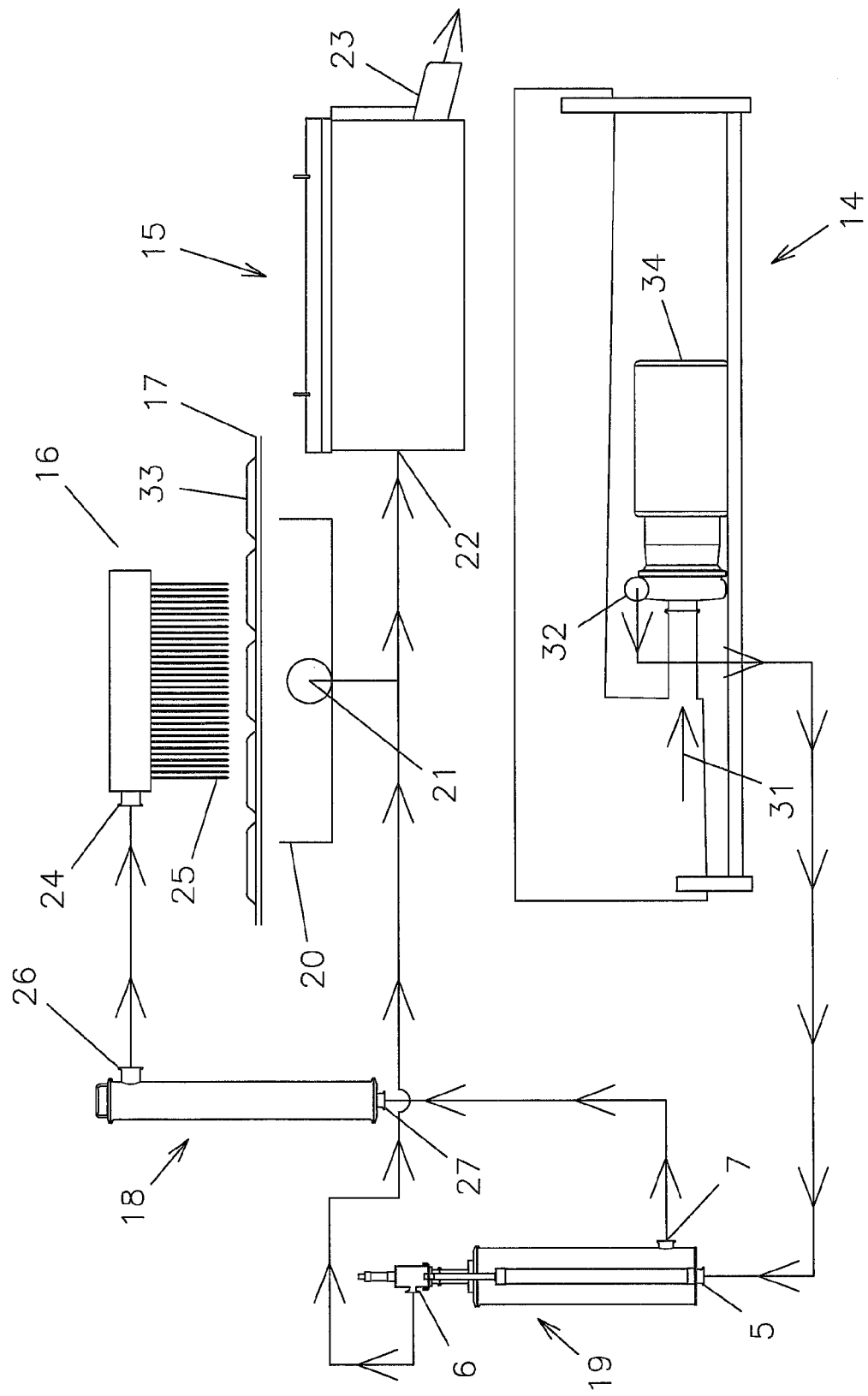
FIG. 4 is a schematic of the complete filter system for the injector using the auto-cleaning filter in-line with the system.

FIG. 4 shows a representative drawing of a complete filter system used to filter the brine on a product injector system. In this system, brine will be pulled from a brine tank 14 into a pump 34 through a pump inlet 31, and discharged from a pump outlet 32 and into the inlet 5 of the auto-cleaning filter 19. From there, the brine exits the auto-cleaning filter 19 through the outlet port 7. The brine may then flow into a backup in-line filter 18. This is an optional filter to catch any solid particles that may have made it through the auto-cleaning filter. If utilized, the brine will travel into the backup filter 18 through an inlet port 27 on the backup filter 18 and then through an internal screen and out of the outlet port 26 on the backup filter 18. The backup filter 18 is cleaned manually when clogged, but by using the auto-cleaning filter upstream of it, the cleaning should be minimal. After the brine exits the backup filter 18, it flows through a valve (not shown) and into the injector head of the injector 16 through an inlet port 24. The brine flows through the head, enters the injection needles 25 extending downwardly from the head, and is then discharged through the bottom of the needles 25 into the product 33, such as poultry carcasses, that are on top of a perforated belt 17.

Any excess brine that is not retained in the product 33 will flow through the perforated belt 17 and down into the lower body 20 of the injector 16. The brine then drains out of the lower body 20 through a drain port 21 and into an open screen solid separating rotary filter 15 through the inlet side 22 of the filter 15. The open screen solid separating rotary filter 15 has a screen with an internal auger system that rotates to push solids out the discharge end 23 and let the brine fall through the screen and back into the brine tank 14. This cycle then continues as previously described.

The brine mixture that is created as the wiper cleans the screen in the auto-cleaning filter is discharged through the exit port 6 of the auto-cleaning filter. This is reintroduced into the brine system by plumbing this line in with the drain port 21 from the lower injector body 20. The brine mixture is discharged by the open screen rotary filter 15 where the brine will flow through the filter and back into the brine tank 14 to be reused.

The present invention has been described with reference to certain preferred and alternative embodiments that are intended to be exemplary only and not limiting to the full scope of the present invention.

We claim:

1. An auto-cleaning marination filter for a poultry injector system for continuously filtering the marinate and also continuously and automatically cleaning the marination filter, comprising:
    (a) a longitudinal outer housing having an interior, an inlet and an outlet;
    (b) a screen having a top and a bottom, the screen shaped into an enclosed configuration within the housing to define an exterior having a surface and an interior having a surface;
    (c) the exterior of the screen and the interior of the housing defining a first liquid containable space;
    (d) the interior of the screen defining a second liquid containable space, with the screen forming an interface between the first and second liquid containable spaces;
    (e) the inlet of the housing configured to receive a mixture containing a liquid and solids into the second liquid containable space;
    the outlet of the housing configured for continuously passing the liquid from the first liquid containable space out of the housing;
    (g) the screen configured to allow continuous passage of the liquid from the second liquid containable space into the first liquid containable space but not the solids constituting the liquid-solid mixture;
    (h) a wiper disposed within the interior of the screen and surrounded by the interior surface of the screen;
    (i) an elongated hollow tube disposed within the interior of the screen and extending longitudinally relative to the outer housing, the hollow tube having an entrance end and an exit end, the wiper being attached to the entrance end of the hollow tube, the exit end of the hollow tube extending beyond the top of the screen and outward of the outer housing;
    (j) a powered actuator for continuously reciprocating the hollow tube within and relative to the housing to continuously move the wiper along the interior surface of the screen during the filtering of the marinate; and
    (k) the wiper configured to define a passageway from the inside surface of the screen through the wiper and into the entrance end of the reciprocating hollow tube for liquid from the first liquid containing space to pass through the screen, through the wiper and into the entrance end of the hollow tube along with the solids disposed along the inside surface of the screen, the exit end of the hollow tube configured to expel the liquid and solids from the hollow tube.

2. The auto-cleaning filter of claim 1, wherein the powered actuator comprises a pneumatic cylinder in communication with the hollow tube.

3. The auto-cleaning filter of claim 2, wherein the pneumatic cylinder is reciprocally coupled to the hollow tube to reciprocate the hollow tube relative to the screen.

4. The auto-cleaning filter of claim 1, wherein said wiper has a first piece and a second piece, wherein a gap is formed between said first piece of said wiper and said second piece of said wiper, wherein said hollow tube is in communication with a valve having an open position and a closed position, wherein said liquid is passable from the first liquid containable space through the screen and into and through said gap and then into said hollow tube when said valve is in said open position.

5. The auto-cleaning filter of claim 4, wherein the wiper comprises an upper circumferential section and a lower circumferential section spaced from the upper circumferential section to define a gap therebetween, said gap defining the liquid passageway from the filter to the hollow interior of the entrance end of the hollow tube.

6. The auto-cleaning filter of claim 1, wherein said hollow tube is received by a cap positioned above said outer housing.

7. The auto-cleaning filter of claim 1, wherein said auto-cleaning filter is in communication with a back-up filter.

8. The auto-cleaning filter of claim 1, wherein said auto-cleaning filter is in communication with a poultry injector.

9. The auto-cleaning filter of claim 1, wherein the exit end of the hollow tube projects outwardly from the outer housing.

* * * * *